(No Model.) 4 Sheets—Sheet 2.
E. A. NEWMAN.
ANTI-FREEZING DEVICE FOR WATER PIPES.
No. 389,100. Patented Sept. 4, 1888.
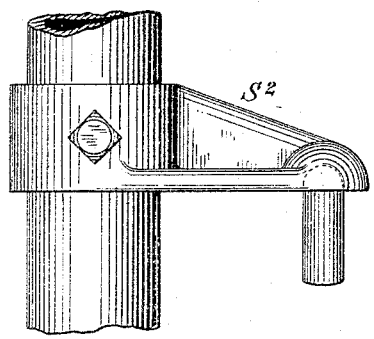
Fig. 11.
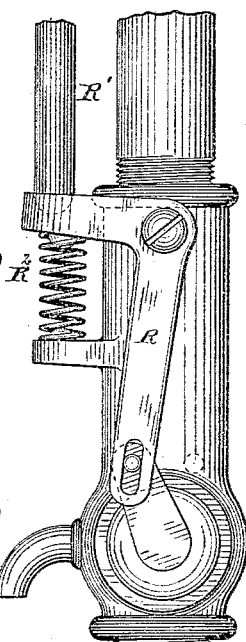
Fig. 12.
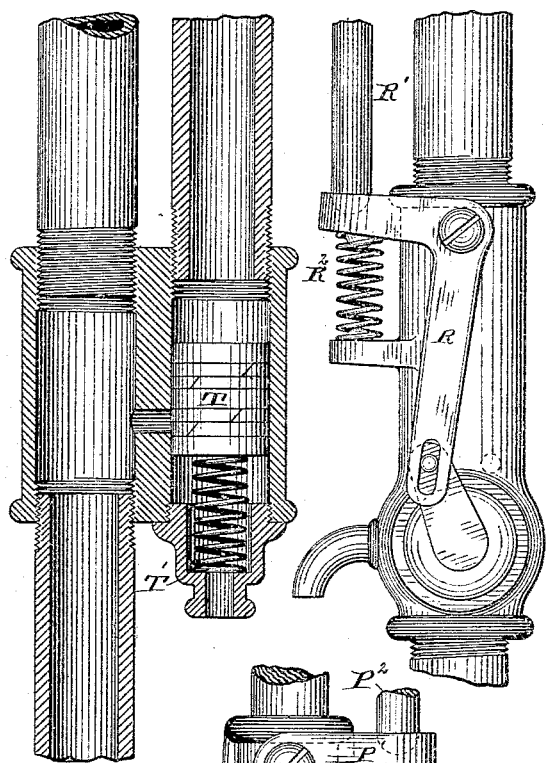
Fig. 9.
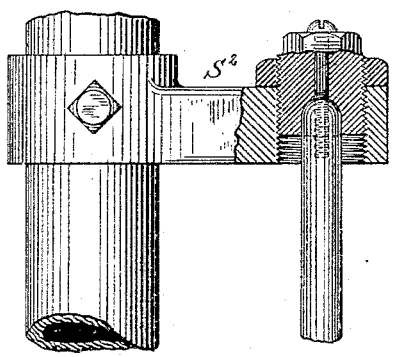
Fig. 10.
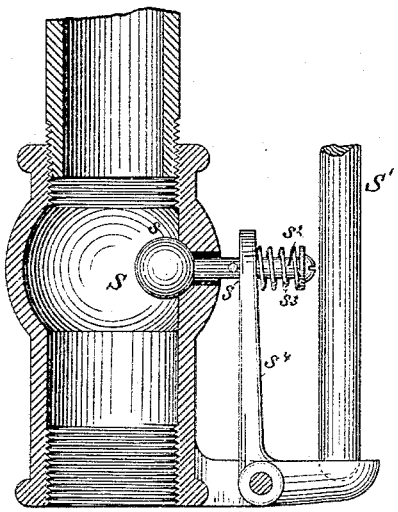
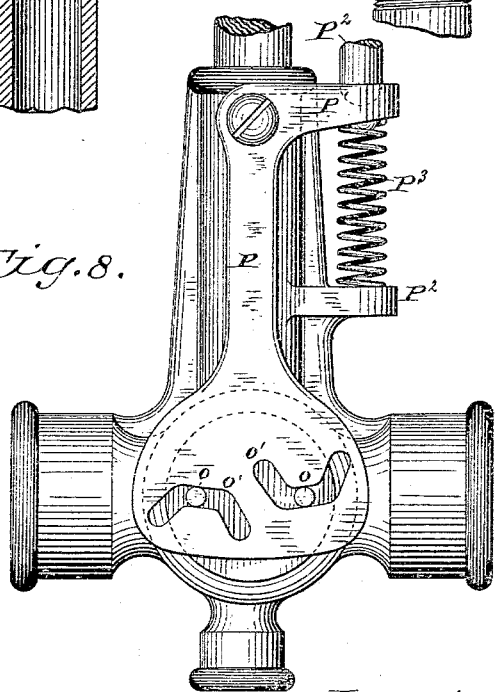
Fig. 8.
Witnesses
H. C. Newman
C. M. Newman
Inventor,
Edwin A. Newman,
By his Attorneys
Baldwin Hopkins & Peyton.

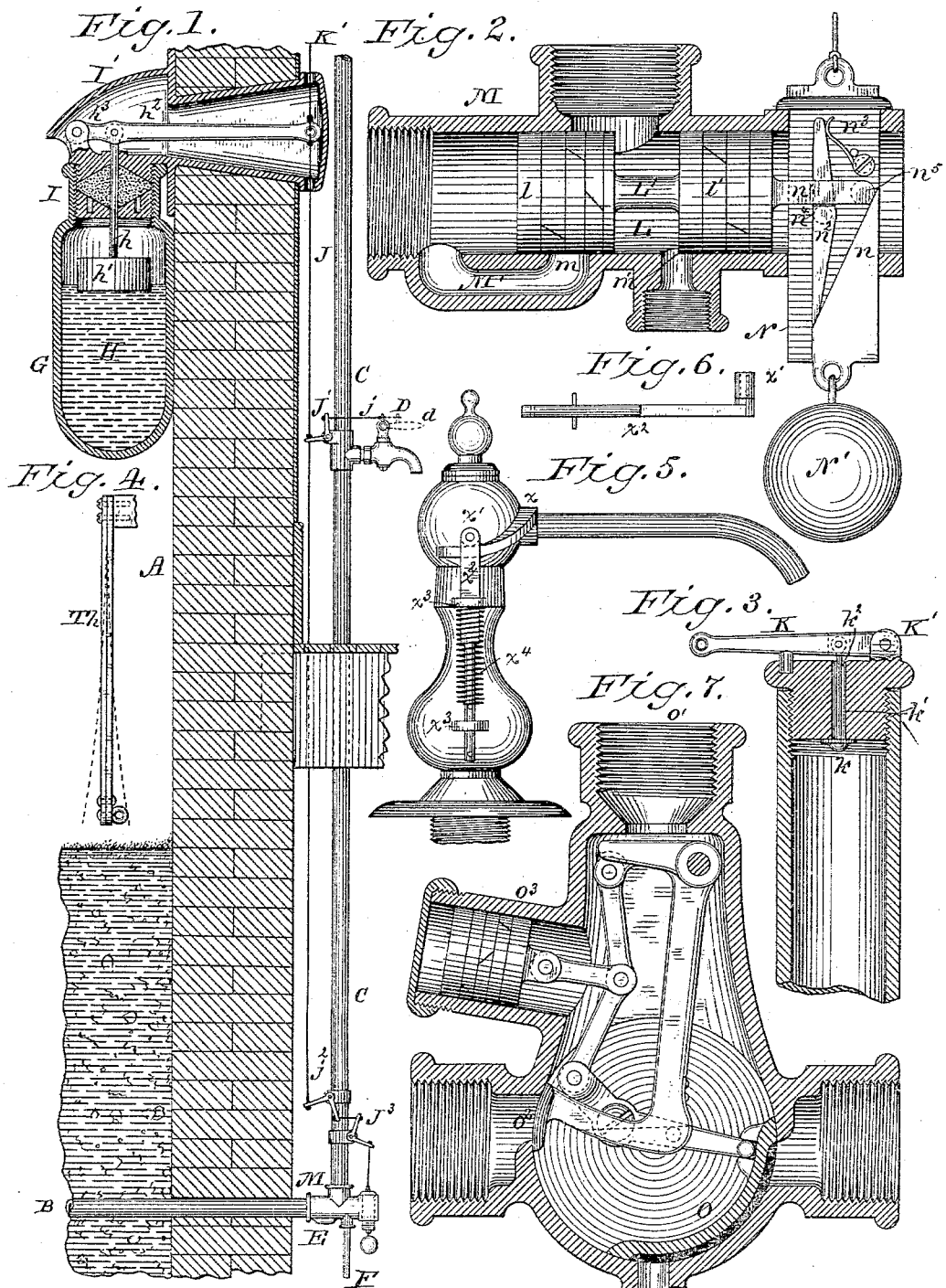

(No Model.) 4 Sheets—Sheet 3.
E. A. NEWMAN.
ANTI-FREEZING DEVICE FOR WATER PIPES.
No. 389,100. Patented Sept. 4, 1888.
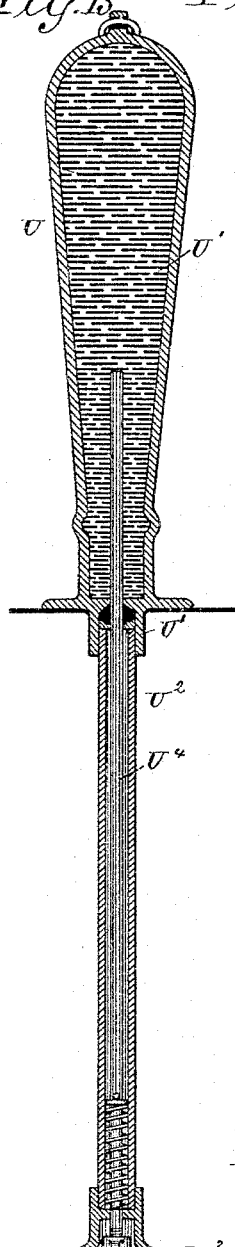
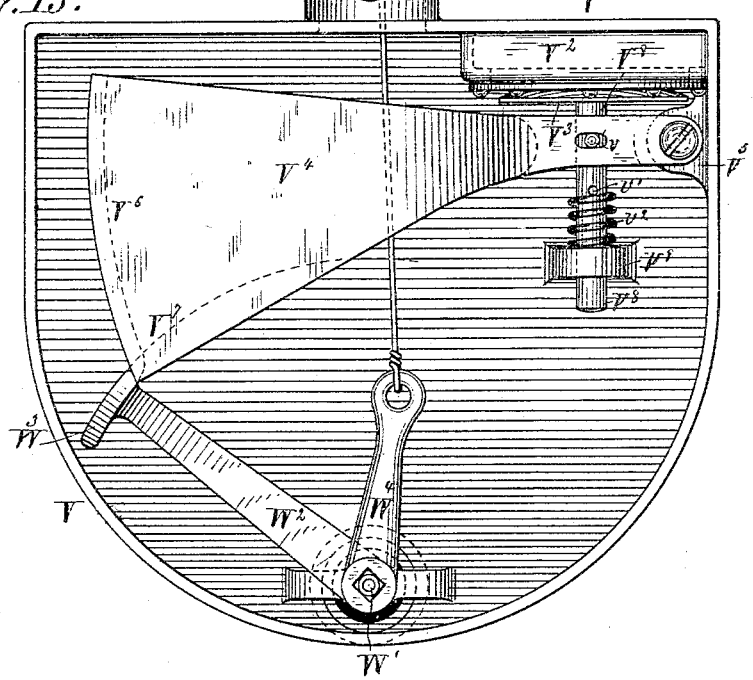
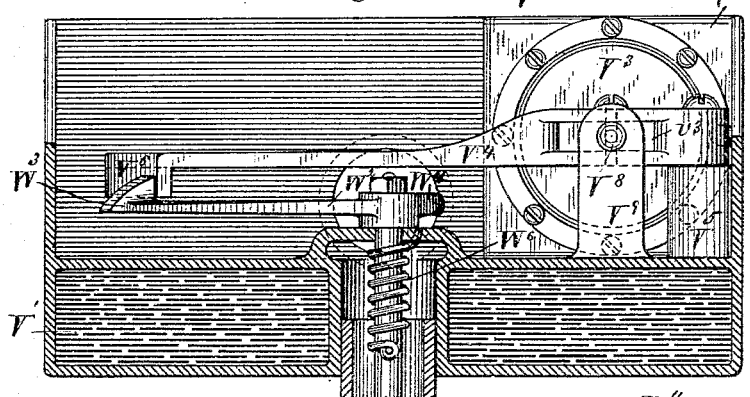
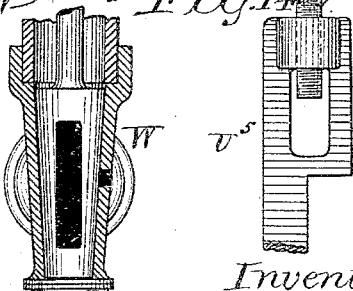
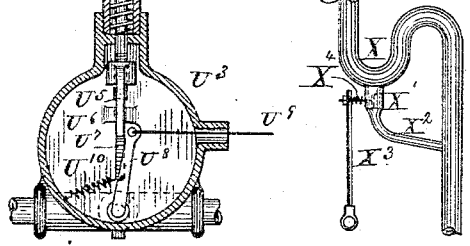
Witnesses,
W. C. Newman,
C. M. Newman.
Inventor.
Edwin A. Newman
By his Attorneys
Baldwin, Hopkins & Peyton.

(No Model.) 4 Sheets—Sheet 4.
E. A. NEWMAN.
ANTI-FREEZING DEVICE FOR WATER PIPES.
No. 389,100. Patented Sept. 4, 1888.
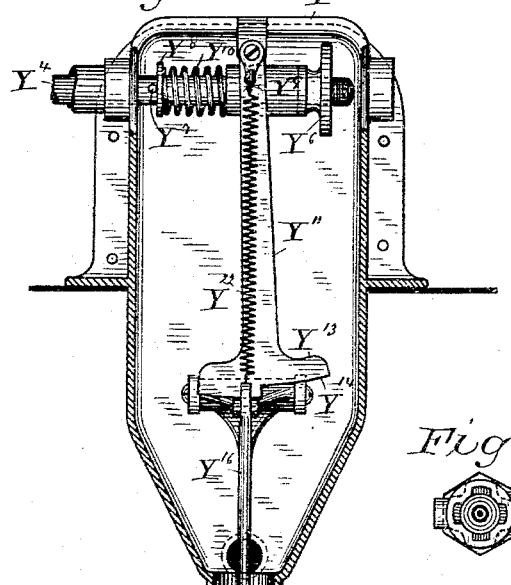
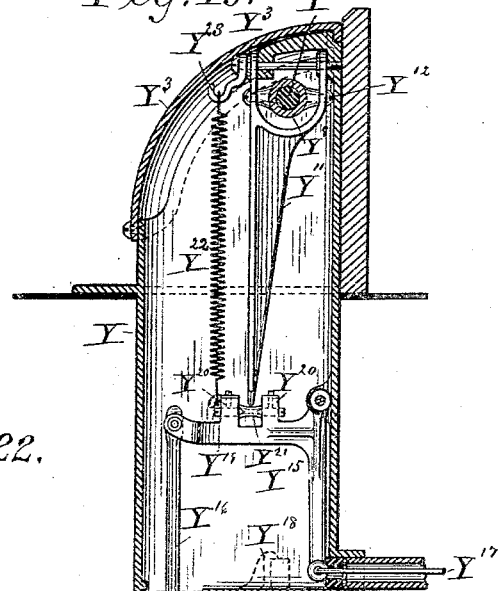
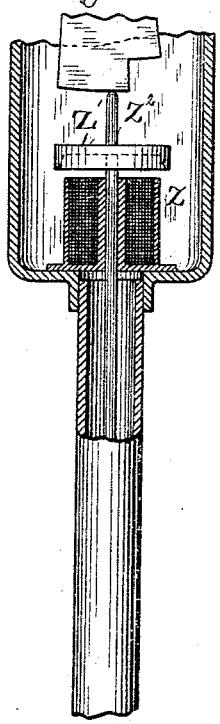
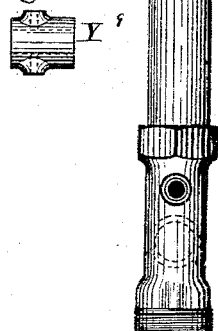
Witnesses,
H. C. Newman,
C. M. Newman,
Inventor,
Edwin A. Newman,
By his Attorneys
Baldwin, Hopkins & Peyton.

UNITED STATES PATENT OFFICE.

EDWIN A. NEWMAN, OF WASHINGTON, DISTRICT OF COLUMBIA, ASSIGNOR TO THE NEWMAN ANTI-FREEZING WATER PIPE COMPANY, OF CHICAGO, ILLINOIS.

ANTI-FREEZING DEVICE FOR WATER-PIPES.

SPECIFICATION forming part of Letters Patent No. 389,100, dated September 4, 1888.

Application filed December 10, 1887. Serial No. 257,548. (No model.)

*To all whom it may concern:*

Be it known that I, EDWIN A. NEWMAN, a citizen of the United States, residing in Washington, District of Columbia, have invented certain new and useful Improvements in Thermostatic Apparatus for Operating Valves, of which the following is a specification.

The object of my invention is to provide improved apparatus for operating valves.

My invention specially relates to the valves of water-pipes and involves improved apparatus for operating the valves to automatically close communication between the main supply-pipe of the street and the service or house-pipes and to open communication between the service-pipes and a drain-pipe. The special design of such an apparatus is to prevent the service-pipes from freezing.

My invention also involves numerous details of construction and sub-organizations of apparatus, hereinafter set forth and claimed.

Letters Patent of the United States have heretofore been granted to me for various forms of apparatus designed to control and automatically operate valves. My present invention, while having the same general object in view, differs materially in the apparatus employed.

In the drawings, Figure 1 is an elevation, partly in section, of one form of my improved apparatus. Fig. 2 is a sectional detail of the main valve employed in said apparatus. Fig. 3 is a detail view of the ventilating-valve at the top of the pipe system. Fig. 4 shows a modified form of thermostat for operating the main valve. Fig. 5 shows a modified way of automatically operating the pull-wire for the main valve. Fig. 6 is a detail of the same. Fig. 7 shows a valve which may be used instead of the valve shown in Fig. 2 when the apparatus is suitably modified for that purpose. Fig. 8 shows another form of valve operated by a thermostat. Fig. 9 shows still another modification. Fig. 10 shows a waste-valve in a pipe operated by a thermostat. Fig. 11 shows a modified way of supporting or attaching the upper end of the thermostat. Fig. 12 shows a pipe with a waste-valve operated by a thermostatic solution. Fig. 13 is a section of a thermostatic apparatus for operating a valve in a pipe, in this instance a thermostatic fluid being employed. Fig. 14 is a detail view showing the manner of connecting the thermostatic rod shown in Fig. 13 with the valve-operating arm. Fig. 15 is a plan view of a different form of thermostatic apparatus for operating the valve. Fig. 16 is a sectional view thereof. Fig. 17 shows an S-trap with a valve therein operated by a thermostat. Fig. 18 shows still another way of thermostatically operating a valve between the main, the service-pipe, and discharge-pipe. Fig. 19 is a sectional view of the apparatus, taken at right-angles to the view shown in Fig. 18. Fig. 20 is a detail of this apparatus, showing the way of securing the outer end of a thermostatic rod. Fig. 21 is a detail of a sleeve on the inner end of the thermostatic rod to which the operating-lever is attached. Fig. 22 is a bottom view of the main valve. Fig. 23 shows a modified way of attaching the bell-crank lever that operates the valve-stem. Fig. 24 shows a way of releasing the valve by means of electricity.

I have shown in the drawings numerous modifications of my invention. Some of the apparatus therein shown may be used separately or in connection with other apparatus.

The subject-matter claimed is hereinafter specifically designated.

Referring to Fig. 1, A indicates the wall of a building; B, a pipe leading to the main supply-pipe of the street; C, the service-pipe of a building; D, a cock or faucet in the service-pipe; E, the main valve between the main supply-pipe and the service-pipe; M, the pipe-coupling; F, a drain-pipe; G, a vessel containing a thermostatic fluid, H. This fluid may be a crude oil, alcohol, or any other suitable fluid which readily expands and contracts with variations in temperature.

The top of the vessel is provided with suitable packing, I, and through this packing extends a rod, $h$, to which is secured a float, $h'$, that rests on the top of the thermostatic fluid. The upper end of the rod $h$ is secured to a lever, $h^2$, between its outer end and its pivot or hinge connection $h^3$. The lever is contained within a casing, $I'$, secured to the outside of a wall and extending through it. To the outer end of the lever is secured a pull-wire, J, which connects with a bell-crank lever, J', secured to the pipe C near the faucet D, or to any other suitable place near the faucet. A bell-crank lever, J$^2$, is secured to the pipe near its lower end and is operatively connected to a bell-crank lever, J$^3$, which is in turn connected to the valve-operating mechanism shown in Fig. 2. The lever $h^2$ may be connected with the arm K of the ventilating-valve shown in Fig. 3 by pull-wire K'. The valve shown in Fig. 3 consists of a small valve, $k$, that normally bears upon a valve-seat at an opening, $k'$, that communicates with the atmosphere. Normally the water-pressure in the pipe holds the valve $k$ closed; but when the pressure is relieved and the valve is opened air may enter through the opening to the pipe and facilitate draining. The valve $k$ is connected to the operating-lever K by a rod, $k^2$. The lever K is hinged to its support K' to allow it to rock and raise and lower the valve stem or rod $k^2$. The main valve L (shown in Fig. 2) is arranged in the coupling M, which unites the main supply-pipe B, the service-pipe C, and the discharge-pipe F. A branch pipe or channel, M', leads from the end of the coupling near the point of junction of the main pipe back to the interior of the coupling nearer the junction of the service-pipe, the distance between the two openings of the channel M' being approximately equal to the length of one of the valve-heads, $l$. The valve-heads $l$ and $l'$ are connected by a short stem, L', leaving a water-passage between them, as shown. When the valve-head $l$ is between the openings of the channel M', water may pass from the main to the service-pipe; but when the valve-head $l$ is over the inner opening, $m$, of the channel no water can pass from the main to the service-pipe. The valve-head $l'$ is so arranged relatively to the valve-head $l$ that when the valve-head $l$ is between the openings of the channel M' it—i. e., the valve-head $l'$—will close the opening $m'$ of the discharge-pipe, and when the valve-head $l$ is over the opening $m$ of the channel the valve-head $l'$ will have moved beyond the opening to the discharge-pipe, so as to leave a communication between the service-pipe and the discharge-pipe. The water-pressure in the main tends to close the valve $l$—that is, it tends to so move the valve as to shut off communication between the main and the service-pipe; but the valve-head $l$ is normally held open by devices which will now be described.

N indicates a plate or bar adapted to slide up and down in a guide transverse to the valves. On this plate is formed an inclined surface or cam, $n$, against which bears a lug, $n^5$, on a rod, $n'$. The rod $n'$ is secured to the head $l'$ of the valve L. The upper end of the plate N is attached to the pull-wire J, and the lower end carries a weight, N'. By this arrangement the weight N' tends to normally hold the plate in the position shown in the figure—that is, at the extremity of its downward movement; but when the pull-cord is operated the plate will be raised and the inclined surface $n$, bearing against the lug $n^5$ on the end of the arm $n'$, will force the valve-head transversely in the coupling, so as to change the position of the valve in the coupling relatively to the three pipes—that is, when the plate has reached the extremity of its upward movement communication between the main and the service-pipe will be established.

$n^2$ indicates a pawl pivoted on the plate N, and having the lug $n^5$ on its inner end normally held against the inclined surface $n$ by a spring, $n^3$. The pawl has a recess, $n^4$, on its upper side, which allows the lug $n^5$ on the outer end of the arm $n'$ to pass beyond the pawl when they are in the same longitudinal line—that is, suppose the valve to be so located as to establish communication between the main and the service-pipe. The end of the arm $n'$ will then be between the pawl and the main coupling, and, if the plate is in the position shown in the drawings, the water-pressure of the main, acting on the valves, will force lug $n^5$ through the recess; but when the plate and pawl are in any other position from that shown in the drawings the lug cannot pass beyond the pawl—that is, the valve will be held so as to leave a communication open between the main and the service-pipes.

Supposing the parts to be arranged as shown in Fig. 2, if the plate N is elevated the inclined surface will bear against the lug $n^5$ on the arm $n'$ and will move it transversely, so as to change the position of the valves. When the plate has reached the extremity of its upward movement, the lug $n^5$ on the rod $n'$ will force the pawl $n^2$ open, and will then occupy a position on the outer side of the pawl and will bear against it, thus holding the valves so as to establish communication between the main and service-pipes. This is the normal position of the several parts—that is, the end of the rod $n'$ normally bears against the outside of the pawl $n^2$ to hold the valve open. The pawl $n^2$ is free to move up and down with the plate N under the arm $n'$; but the lug $n^5$ cannot move transversely past the pawl, except when in line with the recess $n^4$.

Referring now to Fig. 1, it will be observed that the thermostat has been operated by a fall in temperature to close the communication between the main and the service-pipes—that is, the lever $h^2$ has fallen and the plate N is at the extremity of its downward movement. If, now, it is desired to draw water from the service-pipes, it will be necessary to open communication between the main and the service-pipes. This I do in the following manner: The pull-wire J is secured to the bell-crank lever J$^2$, and also secured to the bell-crank lever J', which is secured by a short connecting-wire, $j$, to the arm $d$ of a faucet, D, so that when the faucet is open, as shown by dotted lines, the bell-crank lever J' will be operated to raise the wire, which in turn operates the bell-crank lever J$^2$ and then the bell-crank lever $J^3$, which is connected to the plate N. The plate N will then be lifted and cause the valve L to open communication between the main and the service-pipe. When the faucet is again closed, the weight N' will again pull down the plate N and permit the valves to close, as above described.

The service-pipe is preferably provided with a ventilating-valve such as shown in Fig. 3, the operation of which is fully described in my previous patents, and which has been described above.

Instead of the thermostatic apparatus shown in Fig. 1, a thermostat such as indicated in Fig. 4 may be employed. This thermostat is similar to that shown in some of my previous patents, and is preferably formed of a plate of rubber and a metallic plate secured together. One end is rigidly secured to a support, and the other end is secured to the pull-wire.

Fig. 5 shows a different form of faucet, such as is commonly used for stationary washstands, &c. This faucet will be recognized as the ordinary turning faucet—that is, the spout and frame turn together. On the frame is formed a cam-track, $x$, on which bears a roller, $x'$, secured to a rod, $x^2$, that passes through guideways $x^3$, between which is arranged a spring, $x^4$. The lower end of the rod may be secured to the pull-wire. When the faucet is open, the roller will ride up on the cam-track, and thus elevate the wire and open the valve L.

In Fig. 7 a form of valve is shown similar to valves already shown in my previous patents. The valve O is arranged to open and close communication between the main and the service-pipe and between the service-pipe and the discharge-pipe, the communication between the service-pipe and discharge-pipe being in a recess or channel formed in the under side of the valve.

The valve is connected by jointed levers to a thermostat, not shown in the drawings, but which extends through an opening, O'. A plate, $O^2$, receives the water-pressure from the main and tends to hold the valve closed. Instead of employing a spring between the arms of the jointed levers, I employ jointed links and a piston in a chamber or recess, $O^3$, and the hydraulic pressure in the valve-chamber tends to force the piston into the chamber.

In Fig. 8 a pipe-coupling for joining a main, a service-pipe, and a discharge-pipe is shown. The valve is arranged between them, and is provided with studs, $o$, which work in slots $o'$ in the enlarged end of a lever, P, pivoted on the coupling. An arm, P', of the lever P supports a thermostatic rod, $P^2$. Between the arm P' and a bracket, $P^3$, on the casing is arranged a spring, $P^3$, which tends to elevate the arm when the thermostatic rod is contracted. In the drawings the valve is shown open. By the expansion and contraction of the thermostatic rod co-operating with the spring $P^3$ the valve may be opened and closed.

Fig. 9 shows a valve between a main, a service-pipe, and a discharge-pipe. The valve is provided with a crank-arm which is connected with a bell-crank lever, R, which is in turn connected with a thermostatic rod, R', and a spring, $R^2$. By the expansion and contraction of the thermostat co-operating with the spring $R^2$ the valve may be opened and closed.

Fig. 10 shows a waste-valve located in a pipe and operated by a thermostat. A ball-valve, S, is illustrated, which has a valve-seat, $s$, in the side of the pipe. A discharge-opening, $s'$, leads from the interior of the pipe to the exterior. The valve is normally closed by water-pressure. The valve-stem $s^2$ carries on its outer end a spring, $s^3$, which bears against a bell-crank lever, $s^4$, which is connected with the end of a thermostatic rod, S', secured at its upper end to a bracket, $S^2$, as shown in Figs. 10 and 11. The bell-crank lever $s^4$ is pivoted in a bracket, $s^5$, on the pipe. By this arrangement, should the temperature fall and the thermostatic rod contract, the waste-valve S will be opened and a current of water will pass through the opening—that is, the water will not remain stationary in the pipe so as to freeze.

In Fig. 12 a modification of this apparatus is shown. Here an opening is made between the pipe and an adjusting-chamber, within which is a valve, T. Over the valve is arranged a pipe or chamber, within which a thermostat of some kind is arranged to bear on the valve T. In this pipe a thermostatic solution may be used, which, when in its normal condition—i. e., when expanded—holds the valve closed; but when the thermostat contracts a spring, T', forces the valve open, so as to open the waste-opening.

In Fig. 13 I have shown apparatus for opening and closing communication between a service-pipe and a discharge-pipe by means of a thermostatic solution. U indicates a chamber, which may be formed in a hitching-post, for instance, containing a thermostatic solution, U'. The chamber should be air-tight and securely packed at its lower end. The chamber is connected by a pipe, $U^2$, to the valve-chamber $U^3$ at the pipe-coupling. A rod, $U^4$, extends into the chamber U, and is surrounded by the thermostatic solution or fluid, and connects at its lower end with an arm, $U^5$, which slides up and down in a guide, $U^6$, and has on its lower end an inclined surface or recess, $U^7$. The manner of connecting the arm $U^5$ to the rod $U^4$ is shown in Fig. 14. The valve, which may in this instance be a turning plug, is provided with a valve-operating arm, $U^8$, the outer end of which is connected to a pull-wire, $U^9$. When the weather is warm, the valve is normally held so as to open communication between the main and supply-pipe, the end of the lever then resting against the arm $U^5$, as shown in the drawings; but if the arm $U^5$ is elevated, so as to clear the arm $U^8$, the arm $U^8$ will be thrown over by the spring $U^{10}$ and close communication between the main and the service-pipe and open communication between the service-pipe and the drain-pipe. When the valve is closed between the main and the service-pipe and it is desired to draw water from the pipes, the valve may be opened by means of the pull-wire $U^9$.

I will now describe the apparatus shown in Figs. 15 and 16. This apparatus consists of a casing, V, having a chamber, V', containing a thermostatic fluid or solution. The chamber V' is preferably arranged in the bottom of the casing, and has an upright extension, $V^2$, which carries a flexible diaphragm, $V^3$, so arranged that when the fluid expands and contracts the diaphragm will be moved back and forth. In the upper part of the casing is arranged an arm, $V^4$, hinged at one end to a bracket, $V^5$, and enlarged at its outer end, $V^6$, and having a flange, $V^7$, preferably curved in the arc of a circle. Near its hinged end the arm $V^4$ is provided with a slot, through which extends a pin, $v$, which is secured to a transverse rod, $V^8$, that extends through a bracket, $V^9$. Between the bracket and a pin, $v'$, is arranged a coiled spring, $v^2$, which normally tends to hold the rod $V^8$ in contact with the diaphragm $V^3$. The arm $V^4$ is provided with a slot, $v^3$, through which the rod $V^8$ extends.

W indicates a valve, which may be arranged between a main, a service-pipe, and a drain-pipe in any suitable way. The valve is provided with a valve-stem, W', which is secured at its upper end to an arm, $W^2$, formed of spring metal and having an inclined lug or detent, $W^3$, at its outer end, which bears against the flange $V^7$ of the arm $V^4$. Around the valve-stem $W'$ is arranged a coiled spring, $W^6$, which normally tends to hold the valve closed to cut off communication between the main and service-pipes and to hold the arm $W^2$ in a position reverse of that shown in the figure. As soon as the arm $V^4$ moves away from the end of the arm $W^2$, the arm $W^2$ will move, in the direction shown by dotted lines, with the valve-stem. At the same time the arm $W^4$, which is preferably formed with the arm $W^2$, will move and be limited in its movement by the side of the casing.

To the arm $W^4$ is attached a pull-wire, $W^5$, by which it may be moved to open the valve. By this organization, when the temperature is not low enough to freeze the pipes, the diaphragm will be expanded and will hold the arm $V^4$ in contact with the arm $W^2$, so as to hold the valve open; but when the fluid contracts and the diaphragm is withdrawn from the rod $V^8$ the spring on that rod will force the rod forward, and thus move the arm $V^4$ away from the arm $W^2$, the coiled spring then acting to move the valve, as above indicated. The valve may be opened by the pull-wire, as above suggested, at the same time again engaging the end of the arm $W^2$ with the curved surface or flange of the arm $V^4$.

In Fig. 17, X indicates a water-trap; X', an opening in the bottom of the trap; $X^2$, a pipe leading from the opening to the pipe beyond the trap. Within the pipe $X^2$, at the opening X', is arranged a valve. By opening said valve the trap may be drained. The valve is preferably operated directly by a thermostat, $X^3$, which has a spring, $X^4$.

In Fig. 18, Y indicates the casing of the thermostatic apparatus for operating a valve between a main, a service-pipe, and a drain-pipe. The casing is connected with a pipe or tubular casing, Y', which extends to the valve-coupling $Y^2$ below ground. The lower part of the casing is preferably under ground and the top is provided with a cover, $Y^3$, which may be removed at will to get at the interior apparatus. A thermostatic rod, $Y^4$, extends transversely from the casing in a tubular casing, $Y^5$. The outer end of the rod is secured as shown in Fig. 20. The inner end extends into the casing, and is screw-threaded on its inner end, as shown, to receive a nut, $Y^6$. The rod is provided with a pin at $Y^7$, against which bears a washer, $Y^8$. A sleeve, $Y^9$, bears against the nut $Y^6$, and a spring, $Y^{10}$, is arranged between one end of the sleeve and the washer.

A detail of the sleeve is shown in Fig. 21. A lever, $Y^{11}$, is pivoted in the upper end of the casing and is connected to the sleeve $Y^9$ by pivot-screws $Y^{12}$. The lower end of the lever is formed with an enlarged end, $Y^{13}$, having a recess, $Y^{14}$. A bell crank lever, $Y^{15}$, is pivoted to the casing, as shown particularly in Fig. 19. One end of the lever connects with a valve stem or rod, $Y^{16}$, which extends through the tubular casing Y' to the valve $Y^2$. The other end of the bell-crank lever is attached to a pull-wire, $Y^{17}$. The movement of the bell-crank lever may be limited by a stop, $Y^{18}$. The arm $Y^{19}$ of the bell crank lever $Y^{15}$ is provided with lugs $Y^{20}$, between which is mounted a roller, $Y^{21}$, which bears against the enlarged end of the arm $Y^{13}$. A spring, $Y^{22}$, connects the bell-crank lever with a hook or bracket, $Y^{23}$, in the top of the casing. The spring normally tends to elevate the bell-crank lever—i. e., it supplements the water-pressure which was to close the valve. When the arm $Y^{13}$ is moved so as to bring the recess $Y^{14}$ over the roller, the valve will be closed by the water-pressure and the force of the spring. The valve will then be moved so as to cut off communication between the main and the service-pipe and open communication between the service-pipe and the discharge-pipe. The thermostatic rod operates to move the arm $Y^{13}$. When the temperature falls, the rod contracts and allows the sleeve $Y^9$ to move the arm $Y^{13}$, to which it is connected, so as to bring the recess $Y^{14}$ over the roller on the bell-crank lever, allowing the bell-crank lever to rise and thus move the valve. The valve may be again opened by the pull-wire $Y^{17}$. When the temperature rises and the thermostatic lever again expands, should the roller be in the recess $Y^{14}$ in the end of the arm $Y^{13}$, the parts would be forced unless some yielding arrangement be employed. I employ such a yielding arrangement, as illustrated. The expansion of the thermostatic rod will first operate on the spring $Y^{10}$, which will bear the strain until it is removed by the operation of the pull-wire.

In Fig. 23, I have shown a modified way of mounting the bell-crank lever. In this instance the casing is provided with a narrow recess or compartment, so that the pivots of the bell-crank lever may be readily inserted from the outside. Instead of employing a pull-wire, I may use an electro-magnet, Z, with suitable connections, as shown in Fig. 24. The armature $Z'$ of the magnet carries a finger, $Z^2$, which bears against the recessed lever. When the end of the finger is in the recess, it may be withdrawn by energizing the magnet.

I claim as my invention—

1. The combination, substantially as hereinbefore set forth, of the main, the service-pipe, the drain-pipe, a coupling for connecting them, a valve for opening and closing communication between the main and the service-pipe and between the service-pipe and the drain-pipe, a spring or equivalent device for closing the valve, a thermostat, connections between the valve and the thermostat, arranged to hold the valve against the force of the spring or equivalent device to open communication between the main and the service-pipe when the thermostat is in its normal condition and to permit the spring or equivalent device to close the valve when the thermostat is operated upon by a change in temperature, the faucets in the service-pipe, and the pull-wires connected with the valve and operated by the faucets.

2. The combination, substantially as hereinbefore set forth, of the main, the service-pipe, the drain-pipe, a valve for opening and closing communication between the main and the service-pipe and between the service-pipe and the drain-pipe, the thermostatic valve-operating apparatus for operating the valve to close communication between the main and the service-pipe, the ventilating-valve, and a pull-wire connecting the thermostatic valve-operating apparatus with the ventilating-valve.

3. The combination, substantially as hereinbefore set forth, of the valve, the non-congealable thermostatic fluid, the casing in which it is permanently confined, a spring or equivalent device for closing the valve, a catch for holding the valve open against the force of the spring, and connection between the catch and the thermostatic fluid, whereby the catch is released by a change in the condition of the thermostatic fluid.

4. The combination, substantially as hereinbefore set forth, of the valve, the non-congealable thermostatic fluid, the casing which permanently confines the fluid, the diaphragm or equivalent expanding part of the casing, a spring for closing the valve, the valve-stem, a catch secured thereto, and an arm moved by the diaphragm and with which the catch engages and which holds the catch in a position to hold the valve open against the force of the spring.

5. The combination, substantially as hereinbefore set forth, of the valve, a spring for closing the valve, the thermostatic fluid, its casing having an expanding wall, a catch for holding the valve open against the force of the spring, an arm connecting the expanding wall of the fluid-casing with the catch, and a pull-wire for opening the valve and bringing the catch into engagement with the arm.

6. The combination, substantially as hereinbefore set forth, of the thermostatic fluid, its casing, the diaphragm, the pivoted arm having a curved flange, $V^6$, a spring-catch having a detent engaging with said flange, the valve, the valve-stem to which the catch is secured, and the spring for closing the valve.

7. The combination, substantially as hereinbefore set forth, of the thermostatic fluid, the casing in which the fluid is permanently confined, the diaphragm, the sliding rod connected with the diaphragm, the pivoted arm operated by the movement of the rod, the turning valve, the valve-stem, the catch secured to the valve-stem and engaging with the pivoted arm, and the pull-wire for opening the valve and bringing the catch into engagement with the pivoted arm to turn on the water and reset the apparatus.

8. The combination, substantially as hereinbefore set forth, of the main, the service-pipe, the drain-pipe, a valve for opening and closing communication between the main and the service-pipe and between the service-pipe and the drain-pipe, a thermostat, connection between the thermostat and the valve, whereby the valve is closed by the action of the thermostat, a section of piping provided with a waste-opening, a valve for opening and closing said opening, and a thermostat for operating said valve.

In testimony whereof I have hereunto subscribed my name.

EDWIN A. NEWMAN.

Witnesses:
  Jos. Forrest,
  Lloyd B. Wight.